United States Patent
Pavlik et al.

(10) Patent No.: US 7,600,002 B2
(45) Date of Patent: Oct. 6, 2009

(54) SYSTEM AND METHOD FOR EXPOSING A J2EE APPLICATION SERVER AS A WEB SERVICE TRANSACTION PARTICIPANT

(75) Inventors: Greg Pavlik, Shamong, NJ (US); Aniruddha Thakur, Cupertino, CA (US); Paul Parkinson, Mount Royal, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 777 days.

(21) Appl. No.: 11/051,780

(22) Filed: Feb. 4, 2005

(65) Prior Publication Data

US 2006/0179125 A1    Aug. 10, 2006

(51) Int. Cl.
*G06F 15/16* (2006.01)
(52) U.S. Cl. ...................................... 709/219; 709/203
(58) Field of Classification Search ......... 709/201–206, 709/217–219, 227–232
See application file for complete search history.

(56) References Cited

U.S. PATENT DOCUMENTS

| | | | |
|---|---|---|---|
| 2002/0161826 A1* | 10/2002 | Arteaga et al. .............. 709/203 |
| 2003/0105884 A1* | 6/2003 | Upton ......................... 709/318 |
| 2004/0039964 A1* | 2/2004 | Russell et al. ................. 714/25 |
| 2004/0208164 A1* | 10/2004 | Keenan et al. ............... 370/352 |
| 2006/0161925 A1* | 7/2006 | Aikens et al. ................ 719/313 |

\* cited by examiner

*Primary Examiner*—Yasin M Barqadle
(74) *Attorney, Agent, or Firm*—Park, Vaughan & Fleming LLP

(57) ABSTRACT

A system and methods are provided for allowing a transaction based on arbitrary atomic transaction models initiated in a web services environment to be imported into a J2EE application server environment. An extensible mechanism is provided to bridge from the web services environment into XA and execute a web services operation in the context of the bridged transaction. A resource adapter deployed in the application server receives a SOAP request and converts it into a SOAPMessage, and determines whether it comprises a transaction request. The SOAPMessage is inflowed into the application server as Work, and is routed to a SOAP processing engine (instead of packaging the request for delivery to an application component). The SOAP engine processes the request within the context of the transaction imported from the web services environment. A SOAPMessage response may be returned to the resource adapter and serialized to the web services environment.

16 Claims, 3 Drawing Sheets

SYSTEM AND METHOD FOR EXPOSING A J2EE APPLICATION SERVER AS A WEB SERVICE TRANSACTION PARTICIPANT

BACKGROUND

This invention relates generally to the field of computer systems. More particularly, a system and method are provided for enabling or extending a J2EE (Java 2 Enterprise Edition) application server to be a participant in a web service atomic transaction.

Distributed transaction processing is currently performed within a variety of operating environments and upon a variety of computing systems, but with little ability to cross system boundaries. Web service standards have been proposed as a mechanism to provide interoperability between transaction services. For example, in one environment application servers are configured to provide transaction processing within their context of providing web services to clients. In such an environment, methods and standards that are being developed for transaction processing and workflow include Transaction Internet Protocol, WS-AtomicTransactions, qualified Business Transaction Protocol and WS-TXM (Web Services Transaction Management) ACID transaction model. These standards are meant to operate as overlays upon existing transaction services.

Standards and processes being developed for performing transaction processing within a web services environment are not natively supported in the J2EE environment or application server, which has its own transaction model based on the Open Group Distributed Transaction Processing (DTP) standards. As a result, there is currently no open or accessible mechanism to bring into a J2EE environment a transaction initiated in a web services environment in a manner that allows business logic in the J2EE environment to execute while fully supporting the desired ACID (Atomicity, Consistency, Isolation, Durability) properties of a transaction.

The J2EE Connection Architecture (JCA) defines a standard architecture for connecting a J2EE platform to Enterprise Information Systems (EIS) such as database systems, mainframe transaction processing systems, legacy applications, etc. In particular, JCA enables the development of resource adapters. A resource adapter is an integration technology designed to allow an application server (e.g., a J2EE application server) to talk to a backend EIS in its native protocol. A resource adapter provides a specific vendor's implementation of a bridge from J2EE to the EIS, and allows the bridged interaction to leverage system services offered by the application server (e.g., security, transactions).

However, the current resource adapter model requires the EIS to support (or be modified to support) XA, one of the specifications within the DTP model. Resource adapters thus are usually configured to expose an XAResource to facilitate XA communications. The resource adapter model does not provide any integration with the web services processing model in the application server.

Web services (e.g., requests under SOAP (Simple Object Access Protocol)) do not natively support XA; instead, their protocols must be bridged into the XA environment. And, the JCA resource adapter model is not integrated with web services processing capabilities within the application server. Therefore, it is not currently possible, in the J2EE model, for third parties to integrate web services and transactions.

SUMMARY

In one embodiment of the invention, a system and methods are provided for allowing a transaction based on arbitrary atomic transaction models initiated or carried in a web services environment to be imported into a J2EE application server environment by resource adapter providers. In this embodiment, an extensible mechanism is provided to bridge from the web services environment into XA, and execute a web services operation in the context of the bridged transaction.

A resource adapter deployed in the application server receives a SOAP request and converts or formats it into a SOAPMessage, and determines whether it comprises a transaction request. The SOAPMessage is then inflowed into the application server as Work, wherein it is routed to a SOAP processing engine (instead of packaging the request for delivery to an application component). The SOAP engine processes the request within the context of the transaction imported from the web services environment. A SOAPMessage response may be returned to the resource adapter and serialized to the web services environment.

In another embodiment of the invention, a transaction is terminated in response to a request from the web services environment. The termination request is received at the application server's resource adapter and converted or formatted into a SOAPMessage and recognized as a termination command. The transaction information is used to generate a command to the application server (e.g., the SOAP engine or a transaction manager). The transaction is terminated and a response is returned to the resource adapter, which maps the response into a web services protocol message and sends the message to the web services initiator.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

In one embodiment of the invention, a system and method are provided for enabling a J2EE (Java 2 Enterprise Edition) application server, or another Java-based environment for processing transactions, to participate in a transaction initiated external to the application server, such as within a web services environment. Thus, a bridge is provided between the web services environment and the application server, using the two-phase commit protocol to coordinate completion of transactions.

In this embodiment, a resource adapter based on the JCA (Java Connector Architecture) specification acts as a mediator between SOAP (Simple Object Access Protocol) messages and application logic. The resource adapter: detects context information indicating the presence of an inbound transaction context, mediates the inbound context into an XA (Extended Architecture) transaction, provides an endpoint for further communication between the J2EE transaction infrastructure and the web services environment (e.g., to coordinate the completion protocol), and proactively inquires into the status of transactions to facilitate bottom-up recovery (not natively supported in the DTP (Distributed Transaction Processing) model).

Figure 1:
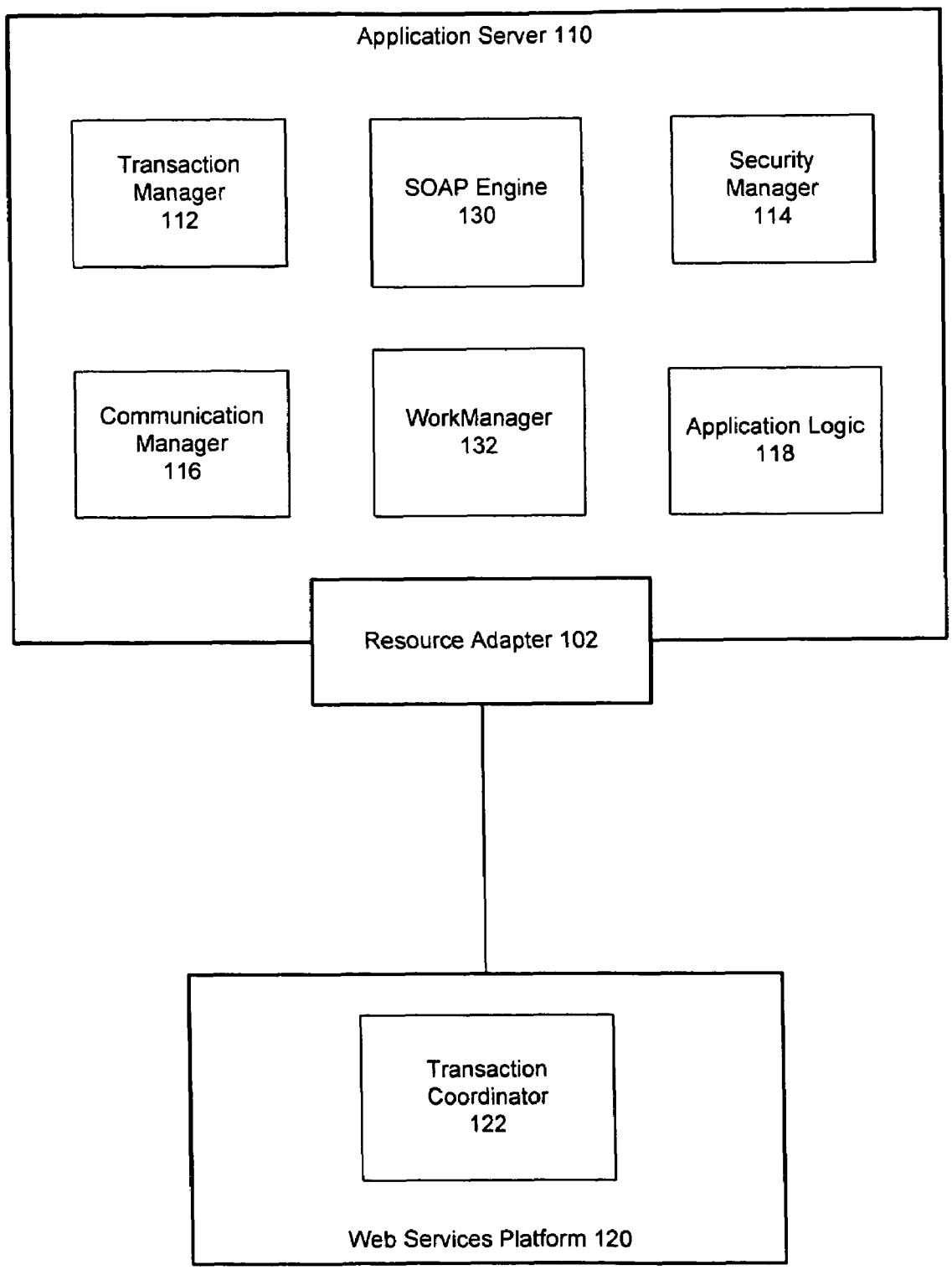
FIG. 1 depicts a computing environment in which an embodiment of the present invention may be implemented.

FIG. 1 is a block diagram depicting the cooperation between a web services environment and a Java-based environment to facilitate a transaction, according to one embodiment of the invention.

In FIG. 1, resource adapter 102 operates within (or at a boundary of) application server 110, and is coupled to web services platform 120. Application server 110 is a J2EE container or is otherwise configured to implement a set of interfaces provided by J2EE. The application server includes transaction manager 112, security manager 114, communication manager 116 and application logic 118. Application logic 118 may include EJBs (Enterprise Java Beans), servlets, CORBA (Common Object Request Broker Architecture) objects or other forms of business logic. Web services platform 120 is configured to provide web services, and includes transaction coordinator 122.

In the embodiment of FIG. 1, application server 110 also includes SOAP processing engine 130 for processing transaction requests, and WorkManager 132 for transferring Work between resource adapter 102 and SOAP engine 130.

Application server 110 may also include or be coupled to a connector (not shown in FIG. 1) such as a JDBC (Java Database Connectivity) object for facilitating access to a database or database management system, and/or other connectors or resource adapters for accessing various enterprise or legacy information systems or other back-end business systems. The application server may also include or have access to JMS (Java Messaging Services).

Resource adapter 102 complies with the J2EE Java Connector Architecture (e.g., version 1.0 or later), and may define various system-level contracts for enabling communication between the application server and web services platform 120, such as contracts for: Connection Management, Transaction Management, Security, Transaction Inflow, Message Inflow, message provider plugability, Lifecycle Management, Work Management, etc. Descriptions of these contracts may be found at http://java.sun.com/j2ee/connector.

The resource adapter accepts network messages from entities outside the application server, and employs SAAJ (SOAP with Attachments API for Java) to create SOAPMessages from the network messages.

Various protocols and communication links may be established between resource adapter 102 and application server 110, and between resource adapter 102 and web services platform 120. In this embodiment of the invention, resource adapter 102 is deployed within the application server, and communicates with components of the application server using local (i.e., address space constrained) programming APIs (Application Program Interfaces).

In an embodiment of the invention, resource adapter 102 allows application server 110 to participate in a distributed transaction initiated by web services platform 120 while fully supporting the ACID (Atomicity, Consistency, Isolation, Durability) properties of a transaction. Upon inflow or importation into the application server, the transaction may scope virtually any application logic executing within the application server, but does not call the logic directly.

As one skilled in the art will appreciate, a resource adapter or other JCA construct is traditionally configured to allow access from a J2EE container to an external entity (e.g., an Enterprise Information System (EIS)). In contrast, in an embodiment of the invention described herein, a resource adapter is configured to provide access to a J2EE container by an external web services environment.

In the embodiment of FIG. 1, resource adapter 102 may be configured to act as a SOAP listener with fully transacted semantics. Web services platform 120 is configured to implement WS-T (for an atomic transaction) or WS-TXM (for an ACID transaction), and is able to issue SOAP messages containing transaction context information. Resource adapter 102 receives such a message (e.g., from transaction coordinator 122), retrieves the transaction context information and converts a payload of the message into work to be submitted to application server 110. The work is performed as a native J2EE transaction.

In an embodiment of the invention, a transaction mediated into a J2EE environment may comprise any number of state changes and/or data manipulation operations, and may require a J2EE application server to access other external entities (e.g., a database, an EIS). In compliance with the ACID properties, all changes effected by the transaction can either be committed (i.e., succeed together) or be rolled back (i.e., fail together).

Figure 2:
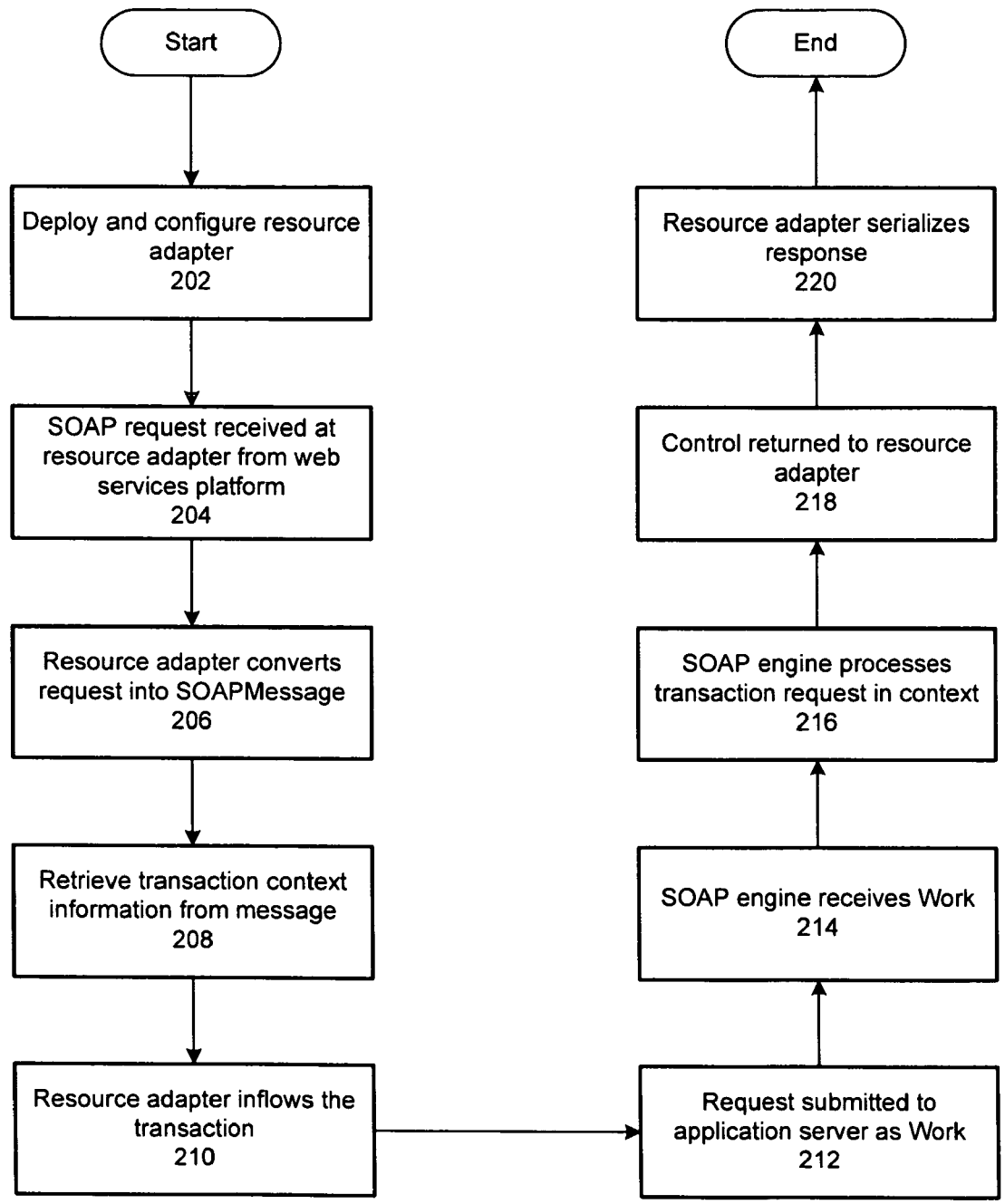
FIG. 2 is a flowchart demonstrating a method of enabling a J2EE application server to participate in a web services transaction, in accordance with an embodiment of the invention.

FIG. 2 demonstrates a method of enabling a J2EE container to participate in a web services transaction, according to one embodiment of the invention.

In state 202, a resource adapter is deployed into and configured to operate within a J2EE application server (e.g., as a plug-in or add-on). Illustratively, the server may be OC4J by Oracle® Corporation. The resource adapter may be configured as a listener, to accept SOAP or XML messages over HTTP or some other communication protocol, and therefore opens a socket to listen for SOAP requests.

Or, the resource adapter may be configured to retrieve or receive messages containing transactions or transactional work to be performed by the J2EE container in some other manner (e.g., by querying a queue that stores such messages).

In state 204, the resource adapter receives a SOAP request (or a message conforming to XML or other compatible format) as a byte stream via HTTP, RMI, a local API or some other suitable protocol.

In state 206, the resource adapter uses the SAAJ API's MessageFactory, or other comparable means to create a SOAP request (e.g., a SOAPMessage) from the byte stream. The message is examined to determine if it is a valid message and if it contains a transaction context intervention that will affect the execution within the J2EE environment. For example, the resource adapter may determine whether a transaction header is present.

In state 208, transaction context information is retrieved from the message. For example, the message may comprise a header that contains the context information, and a payload containing the SOAP message on which work will be performed.

In state 210, the resource adapter inflows the transaction. This is done using a WorkManager API—a JCA API implemented in an application server and available to resource adapters. The WorkManager API helps bridge the transaction into the application server, to help provide the transaction context to the server.

In state 212, the resource adapter submits the transaction (e.g., the SAAJ SOAPMessage) as Work to the application server, via the WorkManager API. Work is a JCA interface used by resource adapters to provide data to an application server for processing.

Illustratively, the resource adapter sets up the Work and the context information on an execution thread of the server, from where they are handed off to the SOAP engine for processing. The use of a SAAJ SOAPMessage to convey Work may be implemented as an extension to the J2EE model.

In this embodiment of the invention, the standard J2EE application server model is modified to recognize the Work instance as a trigger for delegating the Work to the SOAP engine.

In state 214, the application server (e.g., a transaction or WorkManager operating in the application server) recognizes the Work object and routes it to the SOAP processing engine. The SOAP engine will delegate the Work to appropriate components of the application server. As one skilled in the art will appreciate, this differs from the traditional method of handling Work, wherein the request object would be packaged for delivery to an application component (e.g., Enterprise Java Beans).

In state 216, the SOAP engine processes the request in the context of the transaction imported from the web services environment.

In state 218, the application server returns control to the resource adapter, with a SOAP response (e.g., if required by the WSDL (Web Services Description Language) description of the service). The response may comprise a SOAPMessage.

In state 220, the resource adapter serializes the response over the communication link to the web services platform (or other initiator). Illustratively, the response may indicate a status of the requested work—e.g., whether the specified work can be completed successfully, failed or is blocked.

Because an atomic transaction is an all-or-nothing proposition, the outcome of the transaction or transaction operation(s) inflowed into the J2EE container may be merely tentative. The response, which may be directed to a transaction coordinator of a web services platform that initiated the message received by the resource adapter, informs the transaction coordinator of whether the transaction (or portion of the transaction) directed to the Java application server can be completed.

Figure 3:
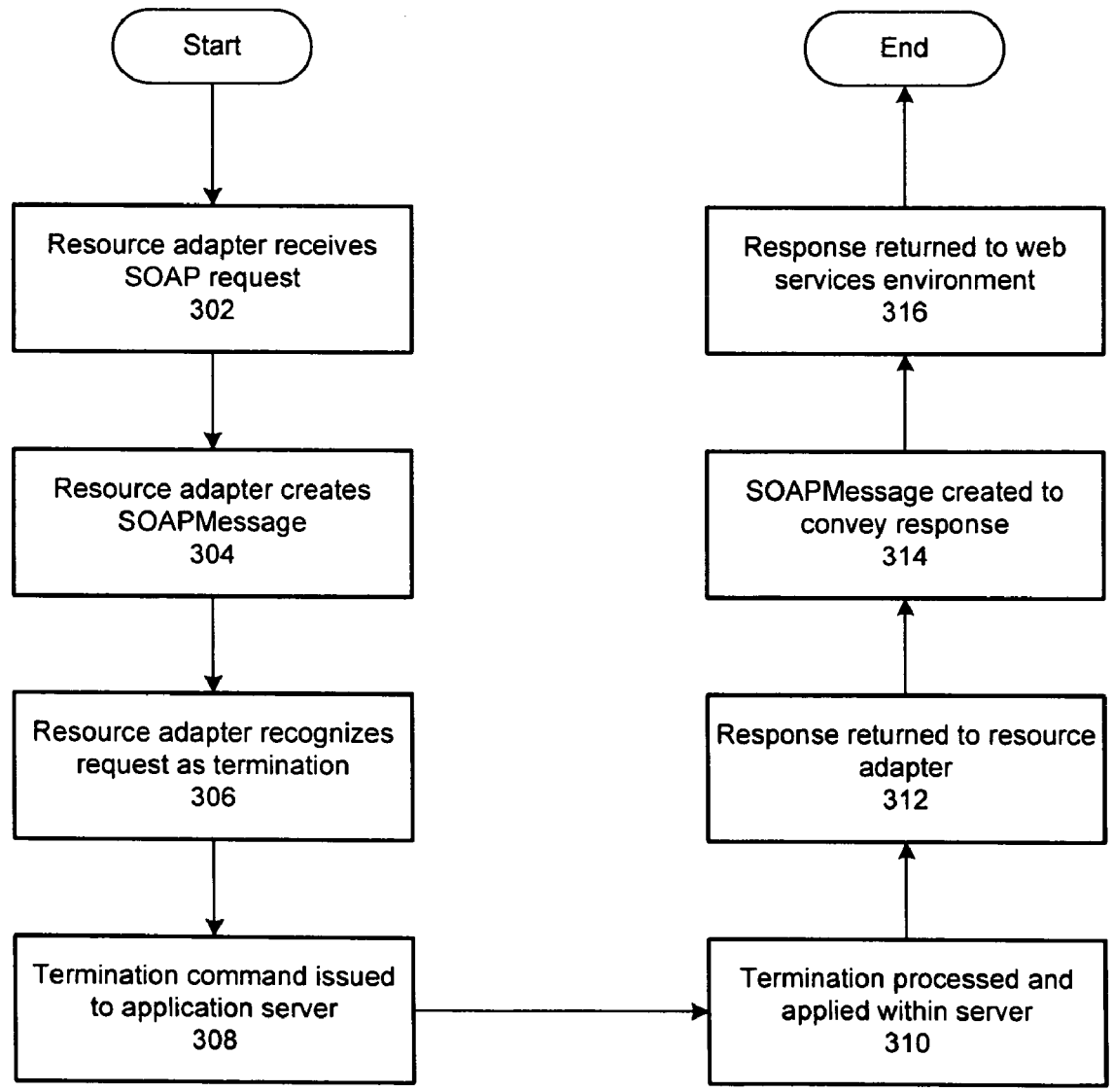
FIG. 3 is a flowchart demonstrating a termination phase of a web services transaction in which a J2EE application server participated, in accordance with an embodiment of the invention.

FIG. 3 demonstrates a method of terminating a transaction, according to one embodiment of the invention. This method may be implemented with the method of FIG. 2. In this embodiment, completion routines driven by an entity external to the J2EE environment (e.g., a web services environment) are tied to the completion routines of the J2EE environment. Thus, an external entity (e.g., a web services transaction coordinator) may direct the J2EE application server to commit or roll back a set of state changes or data manipulation operations previously sent to the server. This allows the application server's view of the transaction to be brought to a coordinated completion status.

In state 302, the application server's resource adapter receives a SOAP request, as a stream of bytes.

In state 304, the resource adapter uses the SAAJ API's MessageFactory (or other comparable interface) to create a SOAPMessage from the byte stream.

In state 306, the resource adapter examines the request (e.g., the SOAPMessage) and identifies it as a transaction termination command.

In state 308, the resource adapter examines information in the transaction, maps it to XA's XID (XA/Open transaction identifier) structure and equivalent command, and configures and issues the termination command to the application server.

An XID comprises a format identifier, global transaction identifier and a branch qualifier; the transaction identifier and the branch qualifier are unique. Both transaction participants and transaction managers use the XID structure. A branch qualifier given by a transaction manager to a participant identifies a unique global transaction and a specific branch.

In state 310, the application server's transaction manager processes the termination command and applies it to local resources or components of the server.

In state 312, a response is returned to the resource adapter.

In state 314, the resource adapter creates a responsive SOAPMessage (e.g., using MessageFactory) and maps the response from XA into a web services transaction protocol message.

In state 316, the SOAPMessage is returned to the web services environment.

The process depicted in FIG. 3 may be repeated as required to complete the two-phase commit protocol.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A computer-implemented method of employing a J2EE (Java 2 Enterprise Edition) application server in a web services transaction, the method comprising:

deploying a JCA (Java Connector Architecture) resource adapter in the application server;

receiving a SOAP (Simple Object Access Protocol) transaction request at the resource adapter; wherein the SOAP request is initiated in a web services environment that is external to the application server, and wherein the transaction request comprises context information for a transaction;

inflowing the web service transaction request into the application server from the resource adapter, wherein inflowing the transaction request comprises:

retrieving the context information from the transaction request;

extracting a payload of the transaction request;

using the payload to create a SOAP message on which work will be performed; and sending the SOAP message to a SOAP processing engine in the application server;

receiving the SOAP message at the SOAP processing engine;

processing the SOAP message; returning a response from the SOAP engine; and terminating the transaction in the application server, wherein a termination command is initiated in the external web services environment, and wherein the external web services environment directs the application server to commit or rollback a set of state changes or operations previously sent to the application server.

2. The method of claim 1, wherein the transaction request received at the resource adapter comprises a byte stream.

3. The method of claim 2, wherein said creating comprises formatting the byte stream into the SOAP message.

4. The method of claim 1, wherein said creating comprises invoking a SAAJ (SOAP with Attachments API for Java) application program interface.

5. The method of claim 1, wherein said inflowing comprises invoking a JCA WorkManager application program interface.

6. The method of claim 1, wherein said inflowing comprises receiving the transaction request via a JCA Work interface.

7. The method of claim 6, wherein the transaction request is received as a SOAPMessage.

8. The method of claim 1, wherein the response adheres to a WSDL (Web Services Definition Language) description of the web service.

9. The method of claim 1, wherein:
the transaction request is received from a web service platform; and
said returning comprises forwarding the response to the web service platform.

10. The method of claim 1, wherein said terminating comprises:
receiving a subsequent transaction request at the resource adapter;
identifying the subsequent transaction request as a termination command;
mapping the subsequent transaction request into a JCA command understood by the resource adapter and the application server;
processing the termination command in the application server; and
returning a subsequent response to the termination command.

11. The method of claim 10, wherein the response and the subsequent response comprise SOAPMessages.

12. A computer readable medium storing instructions that, when executed by a computer, cause the computer to perform a method of employing a J2EE (Java 2 Enterprise Edition) application server in a web services transaction, the method comprising:
deploying a JCA (Java Connector Architecture) resource adapter in the application server;
receiving a SOAP (Simple Object Access Protocol) transaction request at the resource adapter; wherein the SOAP request is initiated in a web services environment that is external to the application server, and wherein the transaction request comprises context information for a transaction;
inflowing the web service transaction request into the application server from the resource adapter, wherein inflowing the transaction request comprises:
retrieving the context information from the transaction request;
extracting a payload of the transaction request;
using the payload to create a SOAP message on which work will be performed; and
sending the SOAP message to a SOAP processing engine in the application server;
receiving the SOAP message at the SOAP processing engine in the application server;
processing the SOAP message returning a response from the SOAP engine; and
terminating the transaction in the application server, wherein a termination command is initiated in the external web services environment, and wherein the external web services environment directs the application server to commit or rollback a set of state changes or operations previously sent to the application server.

13. An apparatus for exposing a J2EE (Java 2 Enterprise Edition) application server as a web service participant, comprising:
a JCA (Java Connector Architecture) resource adapter, implemented in hardware, configured to:
receive SOAP (Simple Object Access Protocol) requests from a web service environment, wherein the requests comprise context information for the requests;
convert a SOAP request into a SOAPMessage using a SAAJ (SOAP with Attachments API for Java) application program interface, wherein the SOAP request comprises a web service transaction request, wherein converting the SOAP request comprises:
retrieving the context information from the request;
extracting a payload of the request;
using the payload to create a SOAP message on which work will be performed; and
inflow the SOAPMessage into a J2EE application server in which the resource adapter is deployed; and
a SOAP processing engine, implemented in hardware, configured to:
receive the SOAPMessage;
process the web service transaction request;
return a response to the transaction request to the resource adapter for forwarding to the web service environment; and
terminate the transaction in the application server, wherein a termination command is initiated in the external web services environment, and wherein the external web services environment directs the application server to commit or rollback a set of state changes or operations previously sent to the application server.

14. The apparatus of claim 13, further comprising:
a transaction manager configured to coordinate a web service transaction on the application server, wherein the transaction manager comprises the SOAP processing engine.

15. The apparatus of claim 13, further comprising:
business logic residing in the application server;
wherein the business logic is invoked by the SOAP processing engine during said processing of the web service transaction request.

16. The apparatus of claim 13, further comprising:
a WorkManager configured to transfer the SOAPMessage from the resource adapter to the SOAP processing engine.

* * * * *

UNITED STATES PATENT AND TRADEMARK OFFICE
CERTIFICATE OF CORRECTION

| | | |
|---|---|---|
| PATENT NO. | : 7,600,002 B2 | Page 1 of 1 |
| APPLICATION NO. | : 11/051780 | |
| DATED | : October 6, 2009 | |
| INVENTOR(S) | : Greg Pavlik et al. | |

It is certified that error appears in the above-identified patent and that said Letters Patent is hereby corrected as shown below:

Title page, item (*) Notice:  Subject to any disclaimer, the term of this patent is extended or adjusted under 35 U.S.C. 154(b) by 777 days.

Delete the phrase "by 777 days" and insert -- by 1032 days --.

In column 8, line 8, in claim 12, delete "message" and insert -- message; --, therefor.

In column 8, lines 8-9, in claim 12, delete "returning.. the SOAP engine; and" and insert the same as a new line.

Signed and Sealed this

Seventeenth Day of August, 2010

David J. Kappos
*Director of the United States Patent and Trademark Office*